United States Patent
Agrawal et al.

(10) Patent No.: US 12,045,441 B1
(45) Date of Patent: Jul. 23, 2024

(54) AUTOMATED SCREEN SHOT CAPTURE OF PRIMARY CONTENT

(71) Applicant: MOTOROLA MOBILITY LLC, Wilmington, DE (US)

(72) Inventors: Amit Kumar Agrawal, Bangalore (IN); Peng-Yueh Hsueh, Shenzhen (CN); Xuejin Wang, Xiamen (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/191,364

(22) Filed: Mar. 28, 2023

(30) Foreign Application Priority Data

Feb. 28, 2023 (CN) .......................... 202310212581.4

(51) Int. Cl.
*G06F 3/0483* (2013.01)
*G06F 40/109* (2020.01)
*G06F 40/284* (2020.01)

(52) U.S. Cl.
CPC .......... *G06F 3/0483* (2013.01); *G06F 40/109* (2020.01); *G06F 40/284* (2020.01)

(58) Field of Classification Search
None
See application file for complete search history.

(56) References Cited

U.S. PATENT DOCUMENTS

| | | | | |
|---|---|---|---|---|
| 7,517,086 B1* | 4/2009 | Kurkure | ............... | G09B 21/008 |
| | | | | 351/246 |
| 2007/0015118 A1* | 1/2007 | Nickell | ..................... | G09B 7/02 |
| | | | | 434/118 |
| 2007/0100705 A1* | 5/2007 | Chen | .................. | G06Q 30/0617 |
| | | | | 705/26.35 |
| 2008/0266298 A1* | 10/2008 | Hess | .................. | G01C 21/3673 |
| | | | | 345/467 |
| 2009/0249189 A1* | 10/2009 | Jania | ..................... | G06F 40/143 |
| | | | | 715/234 |
| 2013/0073953 A1* | 3/2013 | Onyenobi | ............... | A61P 25/28 |
| | | | | 715/252 |
| 2014/0013258 A1* | 1/2014 | Jang | ........................ | G06F 9/451 |
| | | | | 715/769 |
| 2014/0074588 A1* | 3/2014 | Bertsch | .................. | G06Q 30/02 |
| | | | | 705/14.42 |
| 2014/0218385 A1* | 8/2014 | Carmi | .................... | G06V 10/25 |
| | | | | 345/620 |
| 2016/0342591 A1* | 11/2016 | Zholudev | ............ | H04L 67/1044 |

(Continued)

*Primary Examiner* — Mandrita Brahmachari
(74) *Attorney, Agent, or Firm* — Isidore PLLC

(57) ABSTRACT

An electronic device, method, and computer program product provide of removing less relevant secondary content (e.g., advertisements, related links, comments, reviews, etc.) prior to generating a static or dynamic screen shot image of the more relevant primary content of an electronic page. A controller of an electronic device executes an application to present, via a display, at least a portion of an electronic page. In response to receiving an input, via at least one input device of the electronic device, to capture a screen shot of the display, the controller identifies primary spatial portion (s) and secondary spatial portion(s) of the electronic page. The controller renders the primary portion(s) of the electronic page into a reduced content electronic page without the secondary spatial portion(s). The controller captures a screen shot image of the reduced content electronic page.

20 Claims, 9 Drawing Sheets

(56) References Cited

U.S. PATENT DOCUMENTS

| | | | | |
|---|---|---|---|---|
| 2017/0068829 A1* | 3/2017 | Shaw | ...................... | G06F 21/50 |
| 2017/0371844 A1* | 12/2017 | Yao | ...................... | G06F 40/106 |
| 2019/0147026 A1* | 5/2019 | Jon | ..................... | G06F 3/04845 |
| | | | | 715/230 |
| 2021/0089334 A1* | 3/2021 | Thota | ............... | G06V 30/19173 |

* cited by examiner

AUTOMATED SCREEN SHOT CAPTURE OF PRIMARY CONTENT

1. TECHNICAL FIELD

The present disclosure relates generally to electronic devices that have a display, and in particular to electronic devices that support capturing a screen shot of image content presented by the display.

2. DESCRIPTION OF THE RELATED ART

Mobile electronic devices such as smartphones are used ubiquitously for many functions. In an example, users of mobile electronic devices select and view visual content such as images and alphanumeric text. Users of mobile electronic devices may choose to capture a screen shot of the display for storing or sharing. The screen shot is a static image of what is currently being presented. An electronic page presenting the visual content may have an information density that cannot be legibly reduced to fit entirely on a display of the mobile electronic device. To read an entirety of a long and/or wide electronic page having greater viewable dimension that the display screen, a user can pan, scroll, or page flip at an appropriate pace for reading comprehension through one or more screens presented on the display of the electronic device.

To save or share the large electronic page, a user may zoom down the presentation sufficiently that a single static image generated by the screen shot encompasses the entirety of the page. For devices with small displays, the resolution of the reduced-sized image may be insufficient for generating a legible representation of the electronic page. Alternatively, the user may create a video recording of the display as the user controls the panning, scrolling or page flipping to view the entirety of a large electronic page. When recording the display, any audio that is being played by the mobile electronic device or that is being detected by microphones of the mobile electronic device is also captured, increasing the size of the video recording file. Some mobile devices may lack the processing or storage capacity to make video recordings. Even if the device is capable, the size of the video recordings tends to be much larger than that of static images. The large size can create limitations on data storage or data throughput availability for storing or sharing the recording. In addition, the user may find the process of controlling a user interface of the mobile electronic device to create the video recording to be inconvenient or difficult.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
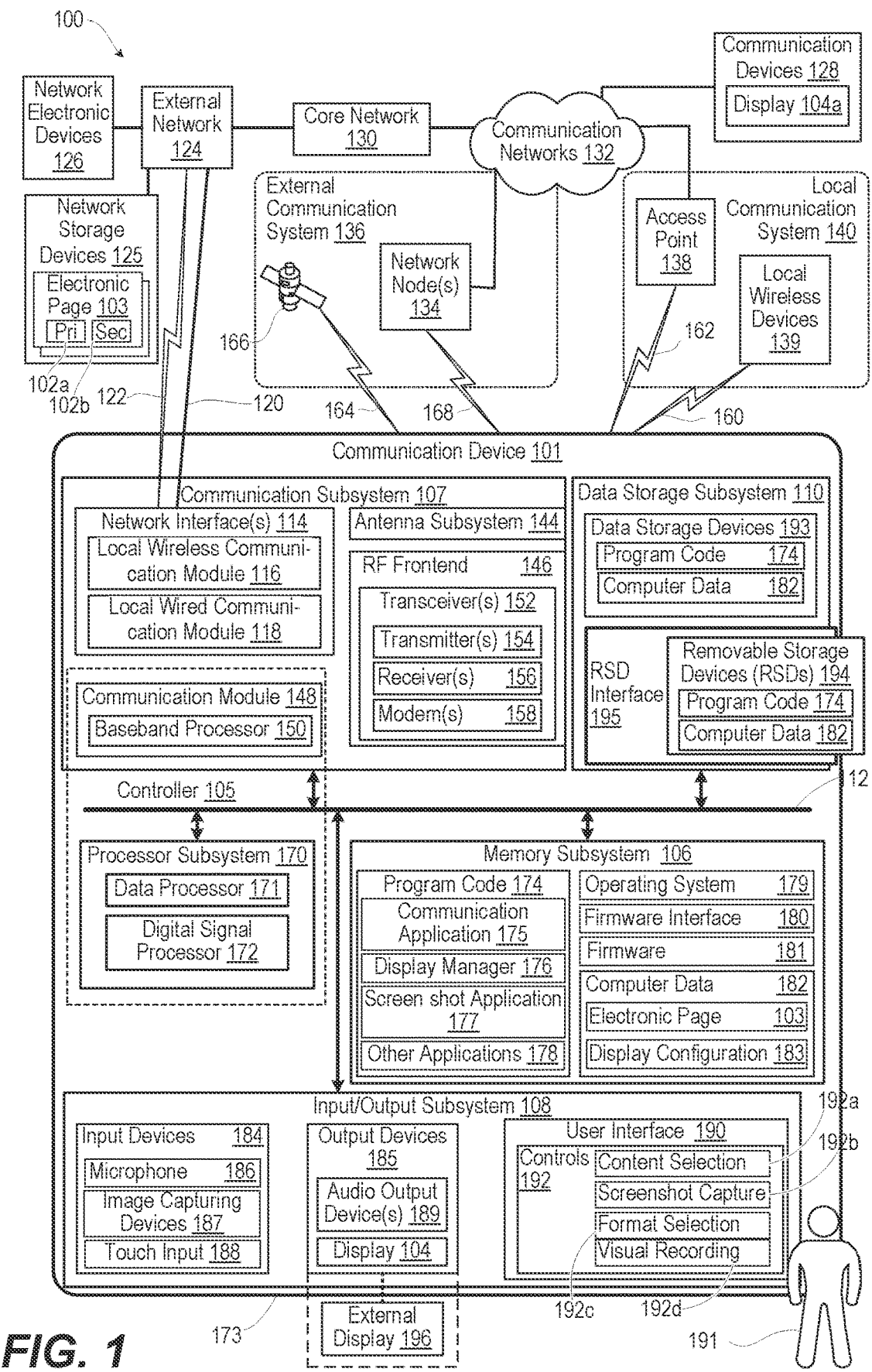
FIG. 1 depicts a functional block diagram of a communication environment including a communication device that automatically removes less relevant content of an electronic page prior to capturing a screen shot image, according to one or more embodiments.

According to aspects of the present disclosure, an electronic device, a method and a computer program product provide a screen shot capturing process that removes less relevant secondary content (e.g., advertisements, related links, comments, reviews, etc.) from an electronic page while generating a screen shot image incorporating the more relevant primary content of the electronic page. The reduction in size of the electronic page enables in some instances a static screen shot to be generated that may be legibly displayed on a small screen. In one or more embodiments, the electronic device includes a display, at least one input device, and a memory, which stores an application that provides an electronic page of visual content. A controller of the electronic device is communicatively connected to the display, the at least one input device, and the memory. The controller executes the application to present, via the display, at least a portion of the electronic page. In response to receiving an input, via the at least one input device, to capture a screen shot of the display, the controller identifies at least one primary spatial portion of the electronic page comprising relevant primary content and at least one secondary spatial portion of the electronic page with less relevant secondary content. The controller renders the at least one primary portion of the electronic page into a reduced content electronic page without the at least one secondary spatial portion. The controller captures a screen shot image of the reduced content electronic page.

Removal of less relevant secondary content reduces the size of the screen shot image, which enables presentation on a small/smaller display, reduces data storage requirements when storing the screen shot image, and reduces communication requirements when transmitting the screen shot image to another device. In one or more embodiments, the present disclosure provides a pre-processing step to generating screen shot images. The present disclosure provides advanced screen shot tools suitable for use on electronic devices having a small display and screen shot capturing capability. The screen shot tools automate selection and formatting functionality to be convenient and effective. In one or more embodiments, the present disclosure s includes determining that screen shot capture has been invoked in an electronic device. In response, a controller of the electronic device determines the amount of content as well as type of the content that is being captured as part of a screen shot. The controller queries a display manager of the electronic device to determine the type as well as the length of the content being rendered on a display of the electronic device. In addition to identifying primary and secondary content, the controller may use artificial intelligence (AI) based image analysis techniques to categorize the screen shot to indicate appropriate formatting options. In an example, the categories can be: (i) a small-sized screen shot of less than two (2) pages; (ii) a medium screen shot of two (2) to four (4) pages of nominal information density or up to three (3) pages of dense information density; and (iii) a large screen shot that has more pages than a medium screen shot. In one or more embodiments, small screen shots are saved as a raster image file, such as Portable Network Graphic (PNG). Medium screen shots are saved as an animated sequence of bit map images such as Graphics Interchange Format (GIF) generated using multiple screen shots sequenced with a customized delay based on the content density. The customized delay is a transition delay time that is selected to provide sufficient time for an expected user to read the content of the medium screen shot. The controller may provide an option to a user to either use animated GIF or use audio-less screen record function to capture the content of a medium screen shot for optimal consumption. Large screen shots may also be captured as a dynamic screen shot image or a visual-only video recording.

According to a first additional aspect of the present disclosure, the controller provides automated static or dynamic format selection of screen shot capture, responsive to size of a display. The controller executes the application to present, via the display, at least a portion of the electronic page. In response to receiving an input, via the at least one input device, to capture a screen shot of the display, the controller determines a number of screens required to present an entirety of the electronic page via the display. In response to the number of screens being equal to or less than a first threshold number of screens, the controller generates a static screen shot image of the electronic page. In response to the number of screens being greater than the first threshold number of screens, the controller generates a dynamic screen shot image that automatically scrolls or page flips through the entirety of the electronic page.

According to a second additional aspect of the present disclosure, the controller provides automated dynamic format of screen shot capture, based on display size and information density. The second aspect occurs after determining that a medium or long screen shot format is appropriate during the first aspect. The second aspect may provide additional functionality and options for generating a dynamic screen shot image such as visual-only video recording. The controller executes the application to provide an electronic page of visual content. The controller renders, via the display manager, the electronic page into a plurality of screens of visual content. The controller communicates one screen of the plurality of screens to the display manager for presentation on the display. In response to receiving a screen shot capture command from at least one input device, to capture a screen shot of the display, the controller determines a number of screens required to sequentially present an entirety of the electronic page being partially presented via the display. The controller determines an amount of readable information contained in the number of screens of the electronic page. The controller determines at least one transition rate required to legibly present each portion of the readable information presented in each screen in transitioning between two of the plurality of screens. The controller generates a dynamic screen shot image comprising at least two partial images with automated transitions at the at least one transition rate for each corresponding transition between the images.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of communication environment 100 that includes an electronic device in which the features of the present disclosure are advantageously implemented. In particular, communication device 101 is an example of the electronic device that automatically removes less relevant secondary content 102b of electronic page 103 prior to capturing a screen shot image of only primary content 102a of electronic page 103. In one or more embodiments, electronic device 101 then automatically selects a format for screen shot capture of electronic page 103 based on a size of display 104, which partially presents electronic page 103. In addition, communication device 101 selects the format for screen shot capture that is in part based on information density of electronic page 103.

Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. Communication device 101 includes controller 105 and memory subsystem 106, communication subsystem 107, input/output (I/O) subsystem 108, and data storage subsystem 110 that are each managed by controller 105. System interlink 112 communicatively connects controller 105 with communications subsystem 106, memory subsystem 106, input/output subsystem 108, and data storage subsystem 110. System interlink 112 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 112 are illustrated in FIG. 1, it is to be understood that more, fewer, or different interconnections may be present in other embodiments.

In one or more embodiments, communications subsystem 107 may include one or more network interfaces 114, such as local wireless communication module 116 and local wired communication module 118, to communicatively couple communication device 101 via network cable 120 or wireless connection 122 to external networks 124. Communication device 101, via external networks 124, may connect to network storage devices 125 that store electronic pages 103 and to network devices 126 such as network servers that facilitate access to network storage device 125. Communication device 101 may communicate with second communication devices 128 via external network 124 or via communication networks 132 that are supported by core networks 130. Network interface(s) 114 may include a network interface controller (NIC) and support one or more network communication protocols. External network 124 can be a local area network (LAN), a campus area network (CAN), a metropolitan area network (MAN), or a wide area network (WAN). For example, network cable 120 and wireless connection 122 can be an Ethernet connection/cable.

In one or more embodiments, communications subsystem 106 may include additional functionality for communicating, using a cellular connection, with network node(s) 134 of external communication system 136 and for communicating, using a wireless connection, with wireless access point 138 or local wireless devices 139 of local communication system 140.

Communications subsystem 106 includes antenna subsystem 144. Communications subsystem 106 includes radio frequency (RF) front end 146 and communication module 148 having baseband processor 150. RF front end 146 includes transceiver(s) 152, which includes transmitter(s) 154 and receiver(s) 156. RF front end 146 further includes modem(s) 158. Baseband processor 150 of communication module 148 communicates with controller 105 and RF front end 146. Baseband processor 150 operates in a baseband frequency range to encode data for transmission and decode received data, according to a communication protocol. Modem(s) 158 modulates baseband encoded data from communication module 148 onto a carrier signal to provide a transmit signal that is amplified by transmitter(s) 154. Modem(s) 158 demodulates each signal received using antenna subsystem 144 from external communication system 136 or local communication system 140. The received signal is amplified and filtered by receiver(s) 156, which demodulates received encoded data from a received carrier signal.

In one or more embodiments, controller 105, via communications subsystem 106, performs multiple types of cellular over-the-air (OTA) or wireless communication with local communication system 140. Communications subsystem 106 can communicate via an OTA connection 160 with local wireless devices 139. In an example, OTA connection 160 is a Bluetooth connection, or other personal access network (PAN) connection. In one or more embodiments, communications subsystem 106 communicates with one or more locally networked devices via a wireless local area network (WLAN) link 162 supported by access point 138. In one or more embodiments, access point 138 supports communication using one or more IEEE 802.11 WLAN protocols. Access point 138 is connected to communication networks 132 via a cellular or wired connection. In one or more embodiments, communications subsystem 106 receives downlink channels 164 from GPS satellites 166 to obtain geospatial location information. Communications subsystem 106 can communicate via an over-the-air (OTA) cellular connection 168 with network node(s) 134.

Controller 105 includes processor subsystem 170, which includes one or more central processing units (CPUs), depicted as data processor 171. Processor subsystem 170 can include one or more digital signal processors 172 that can be integrated with data processor 171. Processor subsystem 170 can include other processors that are communicatively coupled to data processor 171, such as baseband processors 150 of communication module 148. In one or more embodiments that are not depicted, controller 105 can further include distributed processing and control components that are external to housing 173 or grouped with other components, such as I/O subsystem 108. Data processor 171 is communicatively coupled, via system interlink 112, to memory subsystem 106. In one or more embodiments, data processor 171 is communicatively coupled via system interlink 112 to communication subsystem 106, I/O subsystem 108, and data storage subsystem 110. Controller 105 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 106 stores program code 174 for execution by processor subsystem 170 to provide the functionality described herein. Program code 174 includes applications such as communication application 175, display manager 176, screen shot application 177, and other applications 178. In one or more embodiments, several of the described aspects of the present disclosure are provided via executable program code of applications executed by controller 105. In one or more embodiments, program code 174 may be integrated into a distinct chipset or hardware module as firmware that operates separately from executable program code. Portions of program code 174 may be incorporated into different hardware components that operate in a distributed or collaborative manner. Implementation of program code 174 may use any known mechanism or process for doing so using integrated hardware and/or software, as known by those skilled in the art. Memory subsystem 106 further includes operating system (OS) 179, firmware interface 180, such as basic input/output system (BIOS) or Uniform Extensible Firmware Interface (UEFI), and firmware 181. Memory subsystem 106 includes computer data 182 such as electronic page 103 selected for presentation on display 104 by communication application 175. Memory subsystem 106 includes display configuration 183 used by display manager 176 to appropriately render electronic page 103 for presenting on display 104. Computer data 182 may incorporate "data" that originated as raw, real-world "analog" information that consists of basic facts and figures. Computer data 182 include different forms of data, such as numerical data, images, coding, notes, and financial data. The computer data may originate at communication device 101 or be retrieved by communication device 101. Communication device 101 may store, modify, present, or transmit computer data 182. Computer data may be organized in one a number of different data structures. Common examples of computer data 182 include video, graphics, text, and images as discussed herein. Computer data 182 can also be in other forms of flat files, databases, and other data structures.

I/O subsystem 108 includes input devices 184 and output devices 185. Input devices 184 may include microphone 186, image capturing devices 187, and touch input devices 188. Output devices 185 may include audio output devices 189 and display 104 that presents at least a portion of electronic page 103. Using capabilities of input devices 184 and output devices 185, user interface 190 is provided for user 191 to interact with communication application 175 and screen shot application 177. In an example, user interface 190 includes controls 192 that may be visually presented on display 104. Verbal, touch, or gesture command inputs are recognized by user interface 190 as corresponding to and activating controls 192. In an example, controls 192 may include content selection controls 192a to pick electronic page 103 and to pan, scroll, or page flip through portions of electronic page 103. Controls 192 include screen shot trigger controls 192b, which enables user 191 to input a capture command to screen shot application 177 to automatically select a format (i.e., static or dynamic) used to capture a screen shot. Controls 192 enables user 191 to select or configure dynamic screen shot capture by screen shot application 177 using format selection controls 192c and visual recording controls 192d.

Data storage subsystem 110 of communication device 101 includes data storage device(s) 193. Controller 105 is communicatively connected, via system interlink 112, to data storage device(s) 193. Data storage subsystem 110 provides program code 174 and computer data 182 stored on non-volatile storage that is accessible by controller 105. For example, data storage subsystem 110 can provide a selection of computer data 182 and applications, such as communication application 175 and other application(s) 178. These applications can be loaded into memory subsystem 106 for execution by controller 105. In one or more embodiments, data storage device(s) 193 can include hard disk drives (HDDs), optical disk drives, and/or solid-state drives (SSDs), etc. Data storage subsystem 110 of communication device 101 can include removable storage device(s) (RSD (s)) 194, which is received in RSD interface 195. Controller 105 is communicatively connected to RSD 194, via system interlink 112 and RSD interface 195. In one or more embodiments, RSD 194 is a non-transitory computer program product or computer readable storage device. Controller 105 can access data storage device(s) 193 or RSD 194 to provision communication device 101 with program code, such as program code for communication application 175, screen shot application 177, and other application(s) 178, and with computer data 182 such as display configurations 183.

According to aspects of the present disclosure, memory subsystem 106 stores communication application 175, which when executed by controller 105, provides electronic page 103 of visual content. In an example, communication application 175 retrieves electronic page 103 via communication subsystem 107 from network storage devices 125. In another example, communication application 175 retrieves electronic page 103 from memory subsystem 106. Controller 105 further executes communication application 175 to present, via display manager 176 and display 104, at least a portion of electronic page 103. Input device(s) 184 receives an input to capture a screen shot of display 104. In response, controller 105 executes screen shot application 177 to identify primary content 102a contained in at least one primary spatial portion of electronic page 103 and secondary content 102b contained in at least one secondary spatial portion of electronic page 103. Controller 105, via display manager 176, renders at least one primary portion containing primary content 102a of electronic page 103 into a reduced content electronic page 103a (FIG. 2B) without incorporating the secondary content 102b from the at least one secondary spatial portion.

In one or more embodiments, controller 105 determines a number of screens required to present an entirety of electronic page 103 via display 104. Controller 105 automatically generates a static screen shot image of electronic page 103 in response to the number of screens being equal to or less than a first threshold number of screens (e.g., 1.5 screens or 2 screens). The threshold is used to avoid an illegible result when the screen shot image is subsequently viewed on display 104 on communication device 101 or display 104a on second communication devices 128. A static screen shot may be automatically reduced in size to fit entirely on the corresponding displays 104 and 104a. The threshold may be based in part on the size of display 104. In one embodiment, the static screen shot is a raster image file, such as in PNG format. The static screen shot image is a single image that does not include automation. In an example, display manager 176 controls pixel settings of display 104. Display manager 176 generates an image presented on display 104 as raster frames. A static screen shot image is one raster frame. When subsequently presented at a display, such as display 104, the static screen shot image may be sized to fit within dimensions of the display. The static screen shot may be presented without change to resolution, requiring manual panning, scrolling or page flipping by the user to view its entirety.

In response to the number of screens being greater than the first threshold number of screens (e.g., 3 or more screens), controller 105 automatically generates a dynamic screen shot image that automatically scrolls or page flips through the entirety of electronic page 103. The dynamic screen shot image may include a single image or be a composite of more than one image.

In one or more embodiments, input/output subsystem 108 supports additional external input and output devices such as external display 196. In an example, external display 196 may communicatively connect to controller 105 via system interlink 112 such as via a peripheral communication cable and electrical bus connector. In another example, external display 196 may communicatively connect to system interlink 112 and controller 105 via a wired connection or wireless link to communication subsystem 107, as previously described. In one or more embodiments, communication device 101 provides image capturing and communication capabilities. External display 196 provides a larger screen than display 104. Controller 105 provides functionality described herein to capture static and dynamic screen shot images based on display configuration 183 determined for one of display 104 and external display 196 that is being used. In one or more embodiments, controller 105 can modify a stored or received dynamic screen shot image that was generated, based on corresponding display configuration 183 of one of display 104 and external display 196, that is subsequently being rendered for presentation on another one of display 104 and external display 196. In an example, external display 196 is an external monitor. In another example, external display 196 is part of a second electronic device, such as a laptop or desktop computer.

Figure 2A:
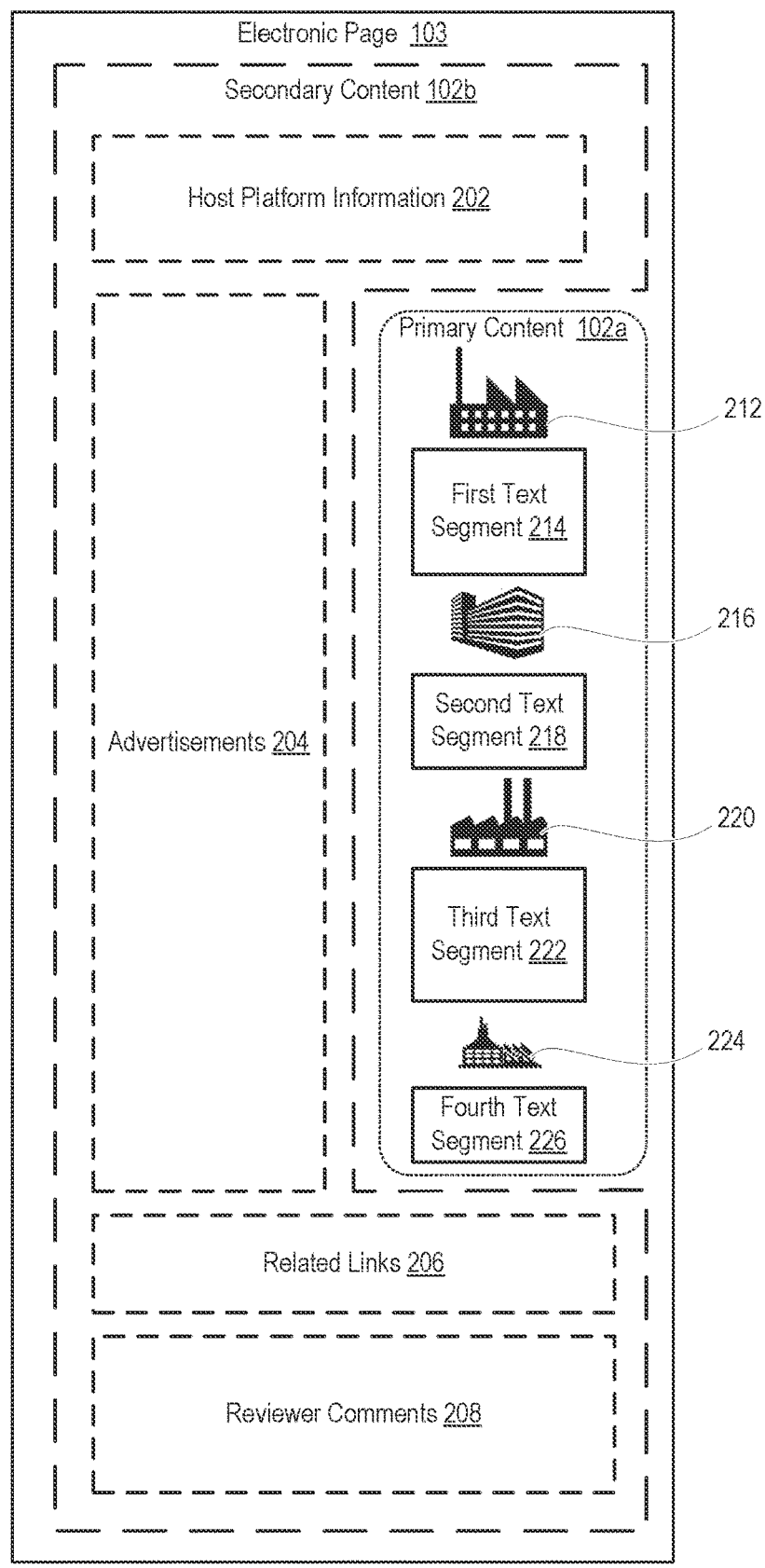
FIG. 2A depicts an example of an electronic page containing primary content and less relevant secondary content, according to one or more embodiments.

FIG. 2A depicts electronic page 103 containing primary content 102a that occupies a primary spatial portion and less relevant secondary content 102b that occupies a secondary spatial portion. In the presented example, secondary content 102b includes website host content 202, advertisements 204, related links 206, and reviewer comments 208 that surround primary content 102a on top, left, and bottom sides. The secondary content 102b is a larger portion of electronic page 103 than primary content 102a, providing an opportunity to reduce a screen shot image to a much smaller, relevant portion. In an example, primary content 102a is a vertical arrangement from top to bottom of first image 212, first text segment 214, second image 216, second text segment 218, third image 220, third text segment 222, fourth image 224, and fourth text segment 226.

Figure 2B:
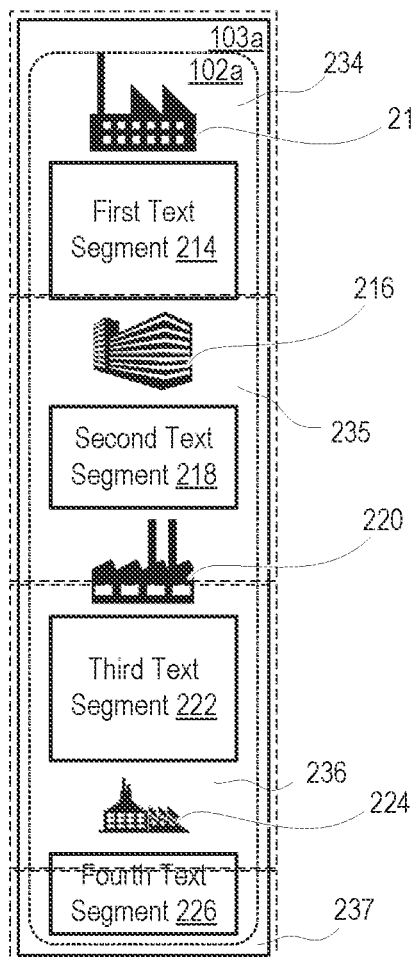
FIG. 2B depicts the electronic page of FIG. 2A after the secondary content is removed, according to one or more embodiments.

FIG. 2B depicts reduced content electronic page 103a that includes primary content 102a, but not secondary content 102b (FIG. 2A). Reduced content electronic page 103a is the result of the reduction of content and may be a final product prior to generating a static or dynamic screen shot image. Alternatively, reduced content electronic page 103a may be an intermediate step prior to any rearrangement as described below with regard to FIG. 2C. to avoid having certain elements that bridge across two screens 234-237. Screens 234-237 represent portions of reduced content electronic page 103a sized for sequential presentation on display 104. First image 212 and first text segment 214 are in first screen 234. Second image 216 and second text segment 218 are in second screen 235. Third image 220 is positioned across second and third screen 235-236. Third text segment 222 and fourth image 224 are on third screen 236. Fourth text segment 226 extends across third and fourth screens 236-237.

Figure 2C:
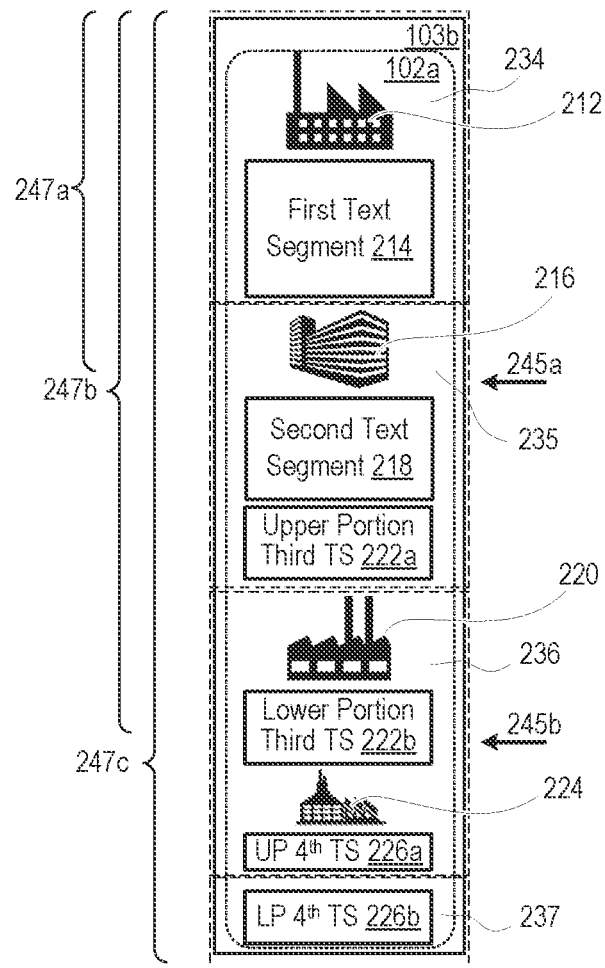
FIG. 2C depicts the electronic page having graphic images and text rearranged to avoid having the graphic images spanning two different screens, according to one or more embodiments.

FIG. 2C depicts a rearranged version of the condensed electronic page 103a having graphic images and text content rearranged to avoid having the graphic images spanning two different screens 234-237 during screen shot capture. Third image 220 is moved down to third screen 236. To utilize the remaining space of second screen 235, third text segment 222 (FIG. 2B) is split into upper portion third text segment 222a and lower portion third text segment 222b. Upper portion third text segment 222a is positioned in second screen 235 below second text segment 218. Lower portion third text segment 222b is positioned on third screen 237 between third and fourth images 220 and 224. Fourth text segment 226 (FIG. 2B) is split into upper portion fourth text segment 226a positioned below fourth image 224 on third screen 236 and split into lower portion fourth text segment 226b positioned on fourth screen 237. Text segments 214, 218, 238, 240, 242 and 244 may respectively have different information density requiring a related amount of time to read. Information density may be defined as a number of words per screen or a number of characters per screen. Information density may also include an adjustment based on a complexity of the information in addition to the quantity of information. For example, inclusion of higher order mathematical equations or words that are lengthy or seldom used can be recognized as increasing the information density.

In summary, primary content 102a of electronic page 103 (FIG. 2A) prepared as reduced content electronic page 103a with reduce content selected for relevance (FIG. 2B) and rearranged for clarity as reduced content electronic page 103b (FIG. 2C). In one or more embodiments, a static screen shot is generated of electronic page 103b. In one or more embodiments, electronic device 101 first increases a zoom size to ensure that the content of the screen shot image is legible. Alternatively, or in addition, in one or more embodiments, electronic device 101 condenses the content by reducing the zoom size down to the minimum legible zoom size to create a more compact static screen shot image. In one or more embodiments, electronic device 101 determines whether electronic page 103b should be captured as a static screen shot image or a dynamic screen shot image. For a dynamic screen shot image, communication device 101 considers information density to provide an appropriate transition between screens 234-237. User 191 (FIG. 1) may interact with communication device 101 (FIG. 1) to read first text segment 214 on first screen 234, to scroll to second screen 235 to read second and fifth text segments 218 and 238, to scroll to third screen 236 to read sixth and seventh text segments 240 and 242 and scroll to partial fourth screen 237 to read eighth text segment 244. User 191 (FIG. 1) paces scrolling through screens 234-237 as subjectively required to read or comprehend text segments 214, 218, 238, 240, 242 and 244.

Physical screen sizes and pixel resolution vary greatly across different types of communication devices 101. In addition, the resolution at a particular screen size required to legibly present characters in different fonts, alphabets and languages also varies. A scenario is depicted in FIGS. 2A-2C that suggests one physical screen size and one size of electronic page 103. Aspects of the present disclosure can be applied to a range of screen sizes and sizes of electronic pages. In an example, the information density of text segments 214, 218, 238, 240, 242 and 244 indicates that first threshold 245a of a number of screens is 1.3 screens, which defines short electronic page size 247a. Second threshold 245b of a number of screens is 2.5 screens, which defines a demarcation between medium electronic page size 247b and large electronic page size 247c. Multi-screen electronic page 103b is larger than second threshold 245b. Multi-screen electronic page 103b falls within dimensions of large electronic page size 247c. In one or more embodiments, different automated or selectable formats for generating a screen shot are triggered by the detected size (i.e., small, medium, or large). In one or more embodiments, the thresholds are set in consideration of a display size being used to view the content and/or a display size of in which the screen shot image is expected to be presented.

Figure 3:
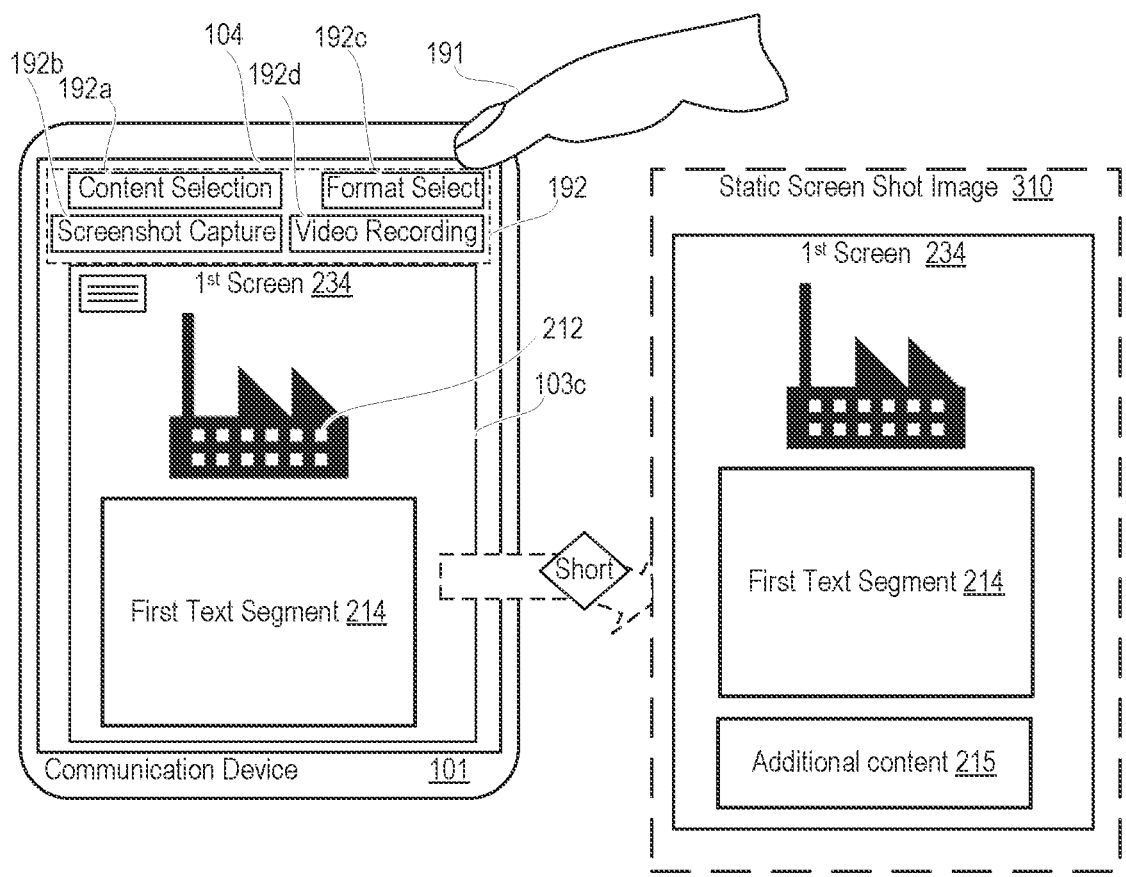
FIG. 3 depicts a front view of the communication device presenting one screen of an electronic page that produces a static screen shot format for a small electronic page, according to one or more embodiments.
Figure 4:
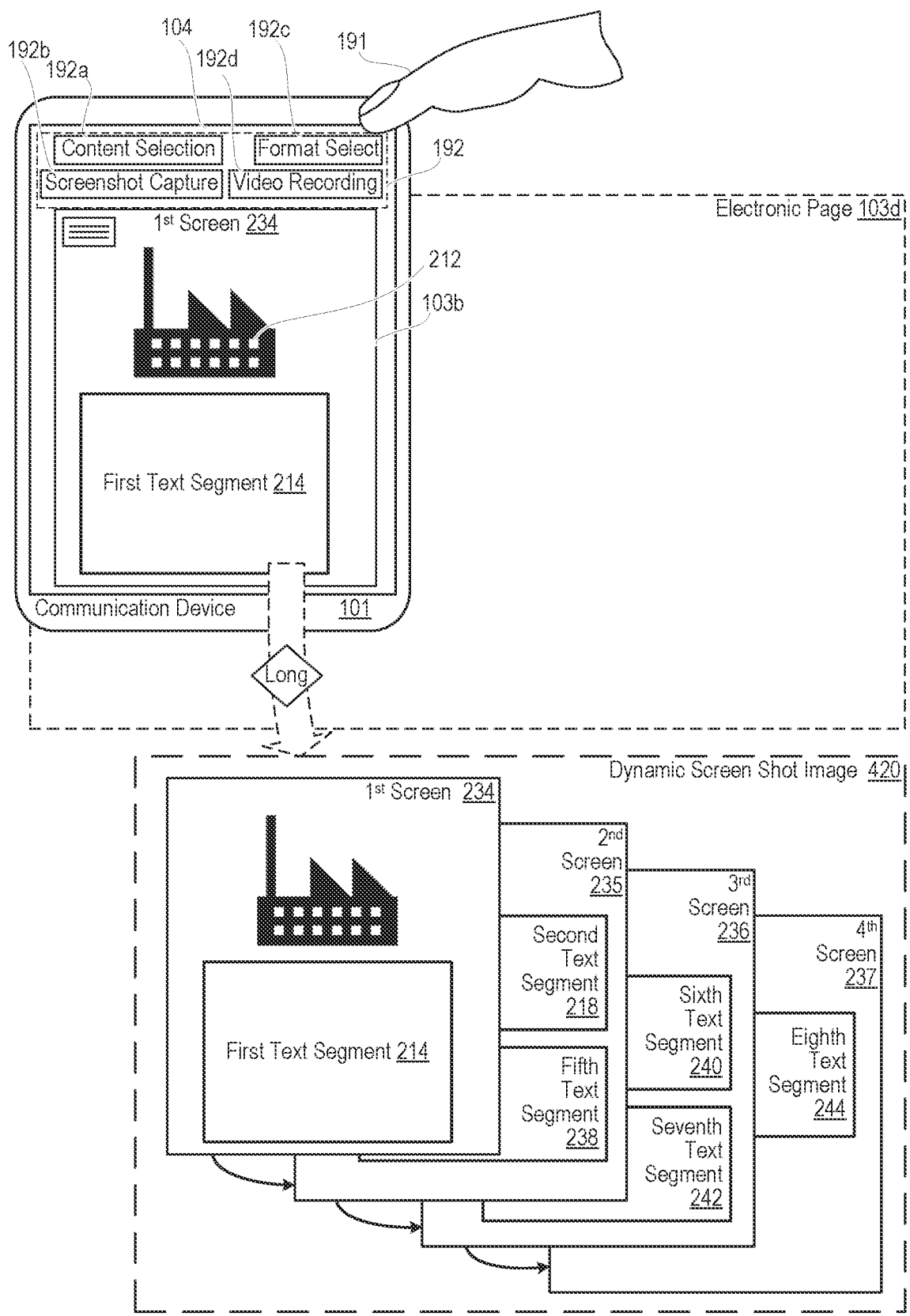
FIG. 4 depicts a front view of the communication device presenting one screen of an electronic page that produces a dynamic screen shot format for a large electronic page, according to one or more embodiments.

FIG. 3 depicts a front view of communication device 101 presenting first screen 234 of electronic page 103c that can be automatically formatted in a static screen shot image 310 (presenting 1.3 screens) with the type of screen shot image and associated number of screens provided dependent on the size of electronic page 103b, screen shot capture setting, and information density or complexity of content. FIG. 4 depicts a front view of communication device 101 presenting first screen 234 of electronic page 103d that can be automatically formatted in dynamic screen shot image 420 (presenting 4 screens), with the type of screen shot image and associated number of screens provided dependent on the size of electronic page 103d, screen shot capture setting, and information density or complexity of content. With reference to both FIGS. 3 and 4, communication device 101 may automatically select static or dynamic format based on analyzing a size of electronic page 103b (FIG. 3) and electronic page 103d (FIG. 4). Communication device 101 includes controls 192, presented on display 104 along with first screen 234, enable user interacting and triggering functionality of dynamic screen shot formatting. Content selection control 192a enables user to select either electronic page 103c (FIG. 3) or electronic page 103d (FIG. 4) for presenting on display 104. Screen shot capture control 192a triggers communication device 101 to capture the currently presented of one of electronic page 103c (FIG. 3) or electronic page 103d (FIG. 4). In response to the trigger, device controller 105 (FIG. 1) automatically formats as either static screen shot image 310 (FIG. 3) or dynamic screen shot image 420 (FIG. 4). With particular reference to FIG. 3, based on determining that electronic page 103c is less than or equal to first threshold 245a (FIG. 2C) in size, controller 105 generates static screen shot image 310 as a raster image that includes first text segment 214. In one or more embodiments, static screen shot 310 includes more than one screen, such as capturing additional content 215. In an example, a display manager renders content into a digital image that defines color and brightness settings to control pixel elements of display 104 as a raster image that may change frame to frame. Screen shot capture records each pixel setting for an image frame. With reference to FIG. 4, based on determining that electronic page 103d is greater than first threshold 245a (FIG. 2C) in size, dynamic screen shot image 420 is generated as an animated presentation of screens 234-237 that respectively includes text segments 214, 218, 238, 240, 242 and 244.

Figure 5:
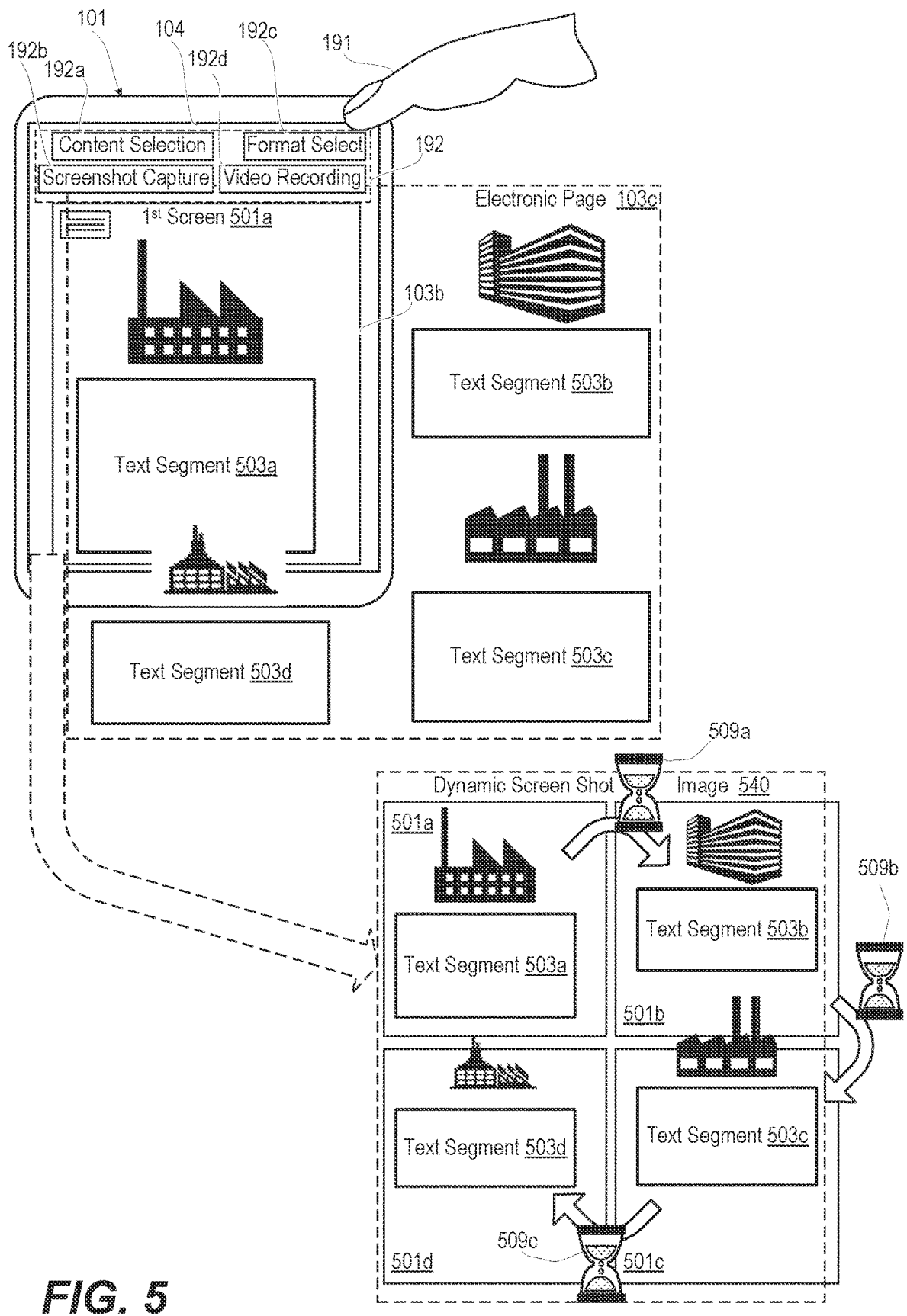
FIG. 5 depicts a front view of a communication device automatically generating a dynamic screen shot image with legibly presented information to capture an entirety of an electronic page that is partially presented on a display, according to one or more embodiments.

FIG. 5 depicts a front view of communication device 101 partially presenting electronic page 103c on first screen 501a. Electronic page 103c requires a two-by-two matrix of screens 501a, 501b, 501c, and 501d to be fully presented in a clockwise manner. In response to receipt of a screen shot command input, communication device 101 automatically captures screens 501a-501d in one or more static screen shot images. Communication device 101 determines information density for respective text segments 503a, 503b, 503c, and 503d for each of screens 501a-501d. Communication device 101 generates dynamic screen shot image 540 that animates presentation of screens 501a-501d with customized time delays 509a, 509b, and 509c according to respective information density in order to legibly present the information (i.e., text segments).

Figure 6:
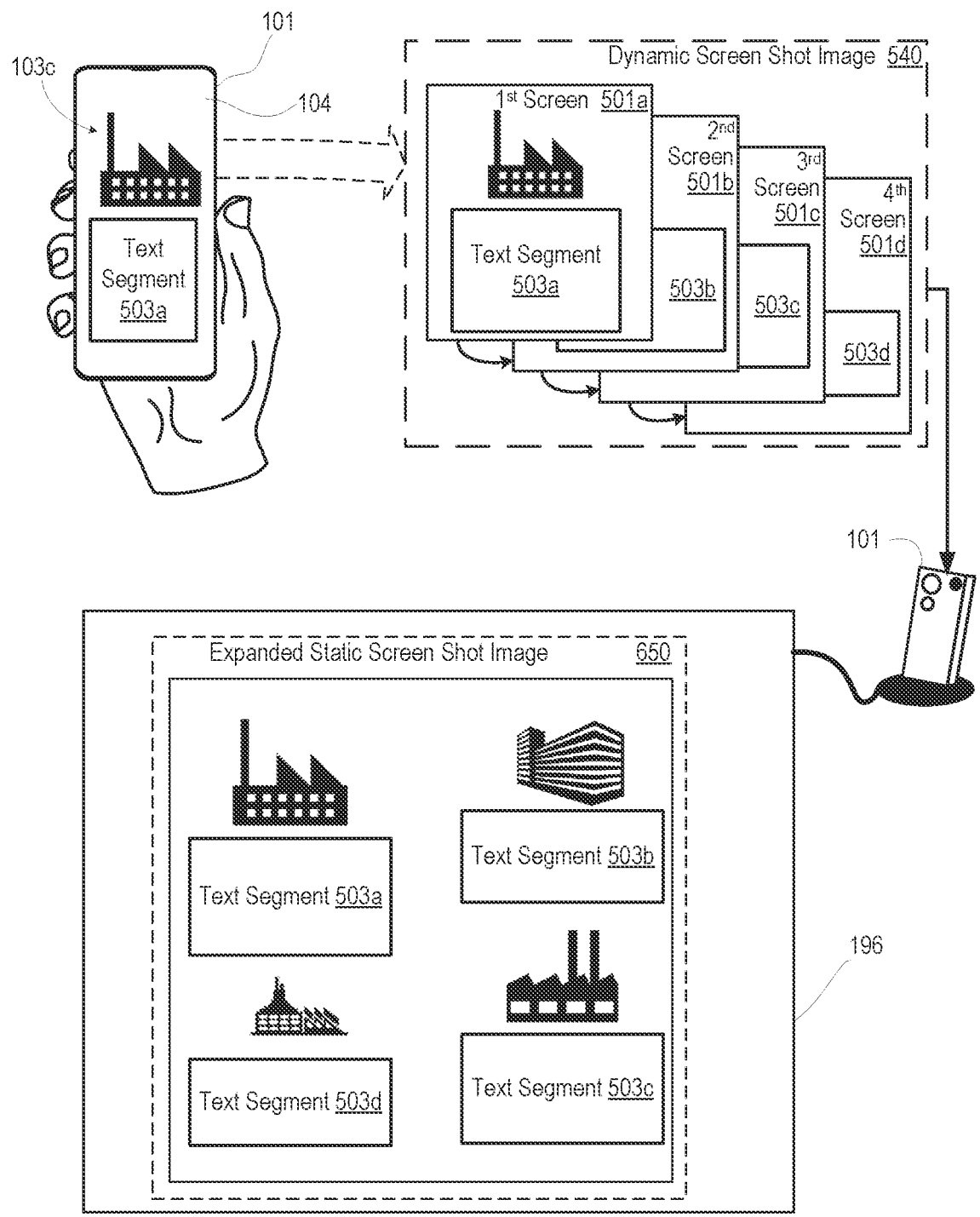
FIG. 6 depicts the dynamic screen shot image generated by the communication device and that is reconstituted as a static screen shot image on a larger external display, according to one or more embodiments.

FIG. 6 depicts dynamic screen shot image 540 that is generated by communication device 101 based on the size of display 104 relative to the electronic document. Subsequently, communication device 101 is communicatively connected to external display 196. In response to a retrieval from memory subsystem 106 or network storage device 125 (FIG. 1) of dynamic screen shot image 540 for presentation on a larger external display, communication device 101 determines, based on a relative larger size of external display 196, that an opportunity exist to reconstitute dynamic screen shot image 540 as expanded static screen shot image 650 that is presented on external display 196.

Figure 7A:
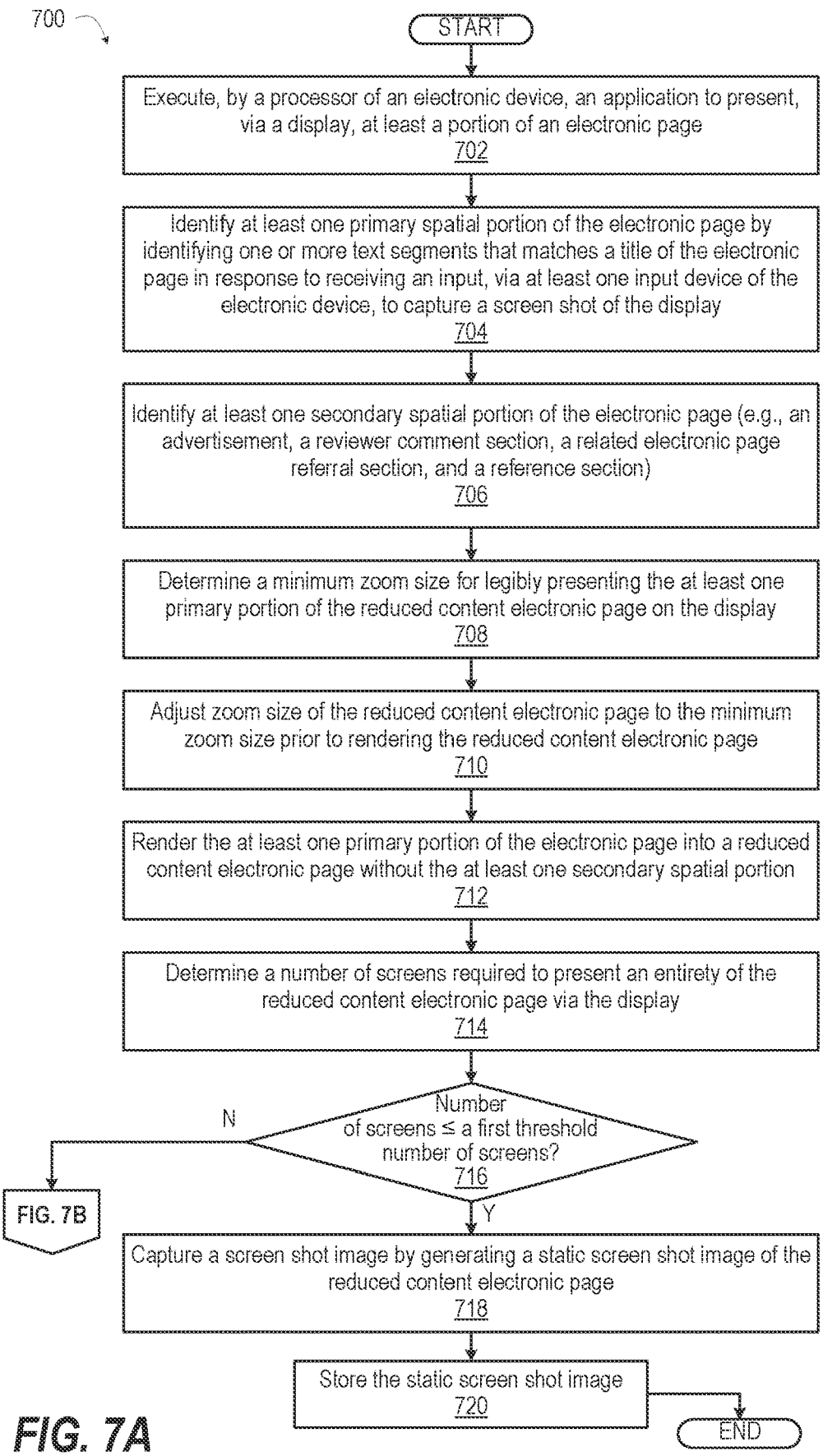
FIGS. 7A-7B (collectively "FIG. 7") are a flow diagram presenting an example method of removing less relevant content prior to generating a screen shot image of an electronic page, according to one or more embodiments.
Figure 7B:
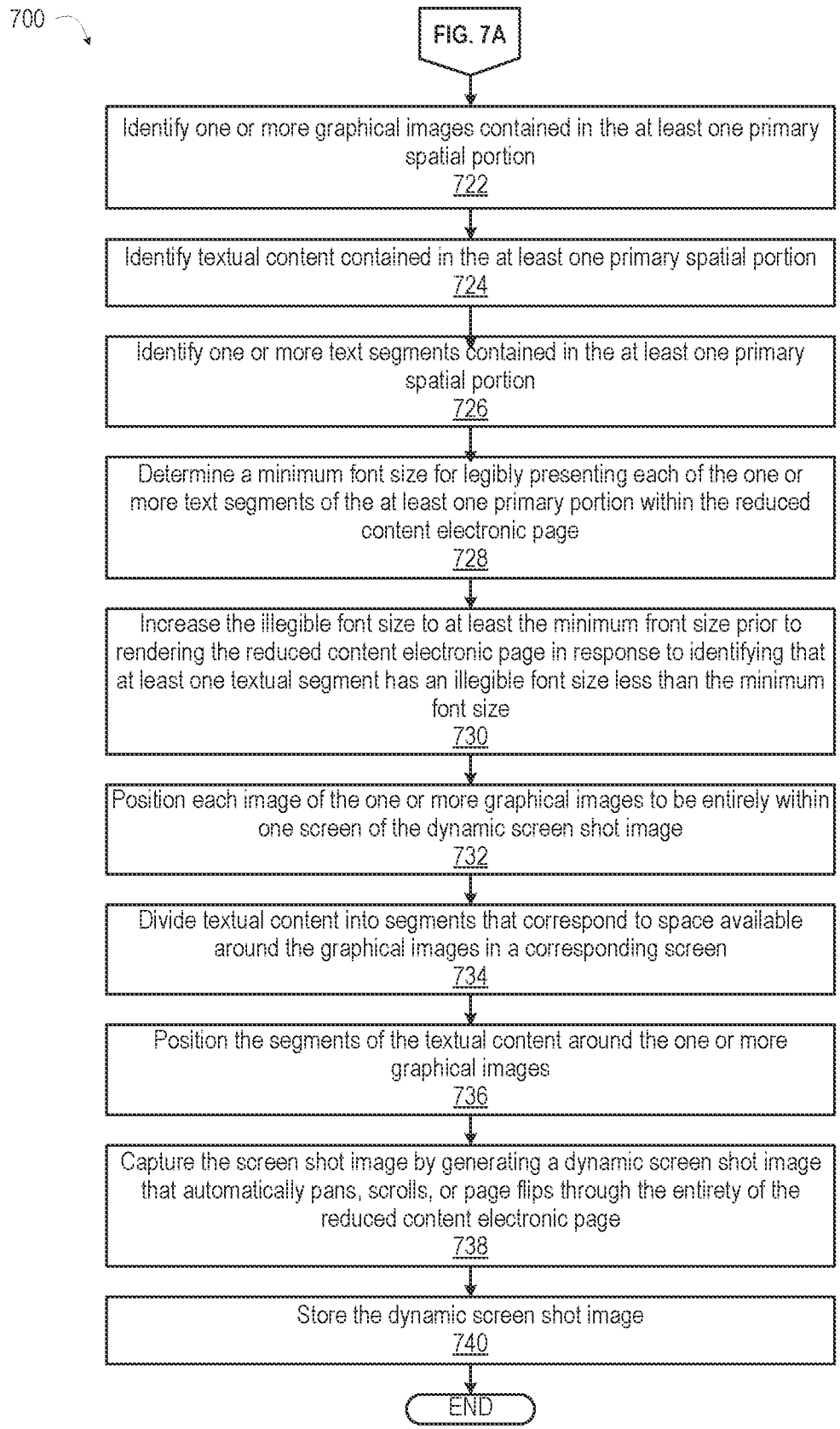

FIGS. 7A-7B (collectively "FIG. 7") are a flow diagram presenting method 700 of removing less relevant secondary content (e.g., advertisements, related links, comments, reviews, etc.) prior to generating a static or dynamic screen shot image of the more relevant primary content of an electronic page. The description of method 700 (FIG. 7) is provided with general reference to the specific components illustrated within the preceding FIGS. 1, 2A-2C and 3-6. Specific components referenced in method 700 (FIG. 7) may be identical or similar to components of the same name used in describing preceding FIGS. 1, 2A-2C and 3-6. In one or more embodiments, controller 105 (FIG. 1) configures communication device 101 (FIG. 1) to provide the described functionality of method 700 (FIG. 4).

With reference to FIG. 7A, method 700 includes executing, by a processor of an electronic device, an application to present, via a display, at least a portion of an electronic page (block 702). Method 700 includes, in response to receiving an input, via at least one input device of the electronic device, to capture a screen shot of the display, identifying at least one primary spatial portion of the electronic page by identifying one or more text segments that matches a title of the electronic page (block 704). Method 700 includes identifying at least one secondary spatial portion of the electronic page (e.g., an advertisement, a reviewer comment section, a related electronic page referral section, and a reference section) (block 706). Method 700 includes determining a minimum zoom size for legibly presenting the at least one primary portion within a reduced content electronic page image on the display (block 708). Method 700 includes adjusting zoom size of the reduced content electronic page image to the minimum zoom size prior to rendering the reduced content electronic page image in response to identifying that a presented zoom size is less than the minimum zoom size (block 710). In one or more embodiments, method 700 includes adjusting the zoom size by increasing the zoom size to the minimum zoom size prior to rendering; however, method 700 does not adjust the zoom size by decreasing the zoom size down to the minimum zoom size. Alternatively, or in addition, method 700 may include determining that a setting enables compacting screen shots to the minimum zoom size. Method 700 may include both adjusting the zoom size either up or down to the minimum zoom size prior to rendering.

Method 700 includes rendering the at least one primary portion of the electronic page into a reduced content electronic page without the at least one secondary spatial portion (block 712). Method 700 includes determining a number of screens required to present an entirety of the reduced content electronic page via the display (block 714).

Method 700 includes determining whether the number of screens are equal to or less than a first threshold number of screens (decision block 716). In response to the number of screens being equal to or less than a first threshold number of screens, method 700 includes capturing a screen shot image by generating a static screen shot image of the reduced content electronic page (block 718). Method 700 includes storing the static screen shot image (block 720). Then method 700 ends.

With reference to FIG. 7B, in response to the number of screens being greater than a first threshold number of screens in decision block 716 (FIG. 7A), method 700 includes identifying one or more graphical images contained in the at least one primary spatial portion (block 722). Method 700 includes identifying textual content contained in the at least one primary spatial portion (block 724). In one or more embodiments, all of the textual content is of a common size. In one or more embodiments, the textual content is not of a common size and method 700 may include treating the textual content differently. Method 700 includes identifying one or more text segments of different text sizes contained in the at least one primary spatial portion (block 726). Method 700 includes determining a minimum font size for legibly presenting each of the one or more text segments of the at least one primary portion within the reduced content electronic page (block 728). In one or more embodiments, method 700 includes adjusting a current font size to the minimum front size prior to rendering the reduced content electronic page i (block 730). In an example, the current font size is increased to improve legibility. In another example, the current font size is reduced to condense the screen shot image. Method 700 includes positioning each image of the one or more graphical images to be entirely within one screen of the dynamic screen shot image (block 732). Method 700 includes dividing textual content into segments that correspond to space available around the graphical images in a corresponding screen (block 734). Method 700 includes positioning the segments of the textual content around the one or more graphical images (block 736). Method 700 includes capturing the screen shot image by generating a dynamic screen shot image that automatically pans, scrolls, or page flips through the entirety of the reduced content electronic page (block 738). Method 700 includes storing the dynamic screen shot image (block 740). Then method 700 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a display;
at least one input device;
a memory storing an application that provides an electronic page comprising primary visual content contained in at least one primary spatial portion of the electronic page and secondary visual content contained in at least one secondary spatial portion of the electronic page that is different from the at least one primary spatial portion; and
a controller communicatively connected to the display, the at least one input device, and the memory, and which:
   executes the application to present, via the display, at least a portion of the electronic page, the electronic page requiring more than a single screen to present an entirety of the electronic page via the display; and
   in response to receiving an input, via the at least one input device, to capture a screen shot of the display:
      identifies the primary visual content contained in the at least one primary spatial portion of the electronic page and the secondary visual content contained in the at least one secondary spatial portion of the electronic page;
      renders the at least one primary spatial portion of the electronic page into a reduced content electronic page without the secondary visual content in the at least one secondary spatial portion;
      determines a number of screens required to present an entirety of the reduced content electronic page via the display; and
      in response to the number of screens being equal to or less than a first threshold number of screens:
         generates a static screen shot image of the reduced content electronic page, the static screen shot being a single image that does not require scrolling or panning to view the entire content, wherein if the number of screens and the first threshold number of screens is greater than one, the static screen shot is automatically reduced in size to fit entirely on the display; and
         captures and stores the static screen shot image of the reduced content electronic page as the screen shot for the electronic page from which the secondary content is automatically removed.

2. The electronic device of claim 1, wherein the controller:
in response to the number of screens being greater than the first threshold number of screens: generates a dynamic screen shot image that automatically pans, scrolls, or page flips through the entirety of the reduced content electronic page; and captures and stores the dynamic screen shot image.

3. The electronic device of claim 2, wherein, in generating a dynamic screen shot image, the controller:
identifies one or more graphical images contained in the at least one primary spatial portion;
identifies textual content of the primary visual content contained in the at least one primary spatial portion;
positions each image of the one or more graphical images to be entirely within one screen of the dynamic screen shot image; and
positions the textual content around the one or more graphical images.

4. The electronic device of claim 1, wherein, in identifying the primary visual content contained in the at least one primary spatial portion, the controller identifies one or more text segments that correspond to a title of the electronic page.

5. The electronic device of claim 1, wherein the visual secondary content contained in each of the at least one secondary spatial portion comprises a content type from a group comprising: (i) an advertisement; and (ii) a reviewer comment section; (iii) a related electronic page referral section; and (iv) a reference section.

6. The electronic device of claim 1, wherein the controller:
determines a minimum zoom size for legibly presenting the primary visual content contained in the at least one primary portion of the reduced content electronic page on the display; and
adjusts zoom size of the reduced content electronic page to the minimum zoom size prior to rendering the reduced content electronic page.

7. The electronic device of claim 1, wherein the controller:
identifies one or more text segments of the primary visual content contained in the at least one primary spatial portion;
determines a minimum font size for legibly presenting each of the one or more text segments of the at least one primary portion within the reduced content electronic page; and
in response to identifying that at least one textual segment has an illegible font size less than the minimum font size, increases the illegible font size to at least a minimum front size prior to rendering the reduced content electronic page.

8. A method comprising:
executing, by a processor of an electronic device, an application that presents, via a display, at least a portion of an electronic page, the electronic page requiring more than a single screen to present an entirety of the electronic page via the display; and
in response to receiving an input, via at least one input device of the electronic device, to capture a screen shot of the display:
   identifying primary visual content contained in at least one primary spatial portion of the electronic page and secondary visual content contained in at least one secondary spatial portion of the electronic page containing secondary content;
   rendering the at least one primary spatial portion of the electronic page into a reduced content electronic page without the secondary visual content in the at least one secondary spatial portion;
   determining a number of screens required to present an entirety of the reduced content electronic page via the display; and
   in response to the number of screens being equal to or less than a first threshold number of screens:
      generating a static screen shot image of the reduced content electronic page, the static screen shot being a single image that does not require scrolling or panning to view the entire content, wherein if the number of screens and the first threshold number of screens is greater than one, the static screen shot is automatically reduced in size to fit entirely on the display; and capturing and storing a screen shot image of the reduced content electronic page as the screen shot for the electronic page from which the secondary content is automatically removed.

9. The method of claim 8, further comprising:
in response to the number of screens being greater than the first threshold number of screens generating a dynamic screen shot image that automatically pans, scrolls, or page flips through the entirety of the reduced content electronic page; and capturing and storing the dynamic screen shot image.

10. The method of claim 9, wherein generating a dynamic screen shot image comprises:
identifying one or more graphical images contained in the at least one primary spatial portion;
identifying textual content of the primary visual content contained in the at least one primary spatial portion;
positioning each image of the one or more graphical images to be entirely within one screen of the dynamic screen shot image; and
positioning the textual content around the one or more graphical images.

11. The method of claim 8, wherein identifying the primary visual content contained in the at least one primary spatial portion comprises identifying one or more text segments that correspond to a title of the electronic page.

12. The method of claim 8, wherein the secondary visual content contained in each of the at least one secondary spatial portion comprises a content type from a group comprising: (i) an advertisement; and (ii) a reviewer comment section; (iii) a related electronic page referral section; and (iv) a reference section.

13. The method of claim 8, further comprising:
determining a minimum zoom size for legibly presenting the primary visual content contained in the at least one primary portion of the reduced content electronic page on the display; and
adjusting zoom size of the reduced content electronic page to the minimum zoom size prior to rendering the reduced content electronic page.

14. The method of claim 8, further comprising:
identifying one or more text segments of the primary visual content contained in the at least one primary spatial portion;
determining a minimum font size for legibly presenting each of the one or more text segments of the at least one primary portion within the reduced content electronic page; and
in response to identifying that at least one textual segment has an illegible font size less than the minimum font size, increasing the illegible font size to at least a minimum front size prior to rendering the reduced content electronic page.

15. A computer program product comprising:
a non-transitory computer readable storage device; and
program code on the computer readable storage device that when executed by a processor associated with an electronic device, the program code enables the electronic device to provide functionality of:
executing, by a processor of an electronic device, an application that presents, via a display, at least a portion of an electronic page, the electronic page requiring more than a single screen to present an entirety of the electronic page via the display; and
in response to receiving an input, via at least one input device of the electronic device, to capture a screen shot of the display:
identifying primary visual content contained in at least one primary spatial portion of the electronic page and secondary visual content contained in at least one secondary spatial portion of the electronic page containing secondary content;
rendering the at least one primary spatial portion of the electronic page into a reduced content electronic page without the secondary visual content and the at least one secondary spatial portion;
determining a number of screens required to present an entirety of the reduced content electronic page via the display; and
in response to the number of screens being equal to or less than a first threshold number of screens:
generating a static screen shot image of the reduced content electronic page, the static screen shot being a single image that does not require scrolling or panning to view the entire content, wherein if the number of screens and the first threshold number of screens is greater than one, the static screen shot is automatically reduced in size to fit entirely on the display; and
capturing and storing a screen shot image of the reduced content electronic page as the screen shot for the electronic page from which the secondary content is automatically removed.

16. The computer program product of claim 15, wherein the program code enables the electronic device to provide functionality of:
in response to the number of screens being greater than the first threshold number of screens: generating a dynamic screen shot image that automatically pans, scrolls, or page flips through the entirety of the reduced content electronic page; and capturing and storing the dynamic screen shot image.

17. The computer program product of claim 16, wherein generating a dynamic screen shot image comprises:
identifying one or more graphical images contained in the at least one primary spatial portion;
identifying textual content of the primary visual content contained in the at least one primary spatial portion;
positioning each image of the one or more graphical images to be entirely within one screen of the dynamic screen shot image; and
positioning the textual content around the one or more graphical images.

18. The computer program product of claim 15, wherein:
identifying the primary visual content contained in the at least one primary spatial portion comprises identifying one or more text segments that matches a title of the electronic page; and
each of the at least one secondary spatial portion comprises a content type from a group comprising: (i) an advertisement; and (ii) a reviewer comment section; (iii) a related electronic page referral section; and (iv) a reference section.

19. The computer program product of claim 15, wherein the program code enables the electronic device to provide functionality of:
determining a minimum zoom size for legibly presenting the primary visual content contained in the at least one primary portion of the reduced content electronic page on the display; and adjusting zoom size of the reduced content electronic page to the minimum zoom size prior to rendering the reduced content electronic page.

20. The computer program product of claim 15, wherein the program code enables the electronic device to provide functionality of:
identifying one or more text segments of the primary visual content contained in the at least one primary spatial portion;
determining a minimum font size for legibly presenting each of the one or more text segments of the at least one primary portion within the reduced content electronic page; and
in response to identifying that at least one textual segment has an illegible font size less than the minimum font size, increasing the illegible font size to at least a minimum front size prior to rendering the reduced content electronic page.

\* \* \* \* \*